UNITED STATES PATENT OFFICE.

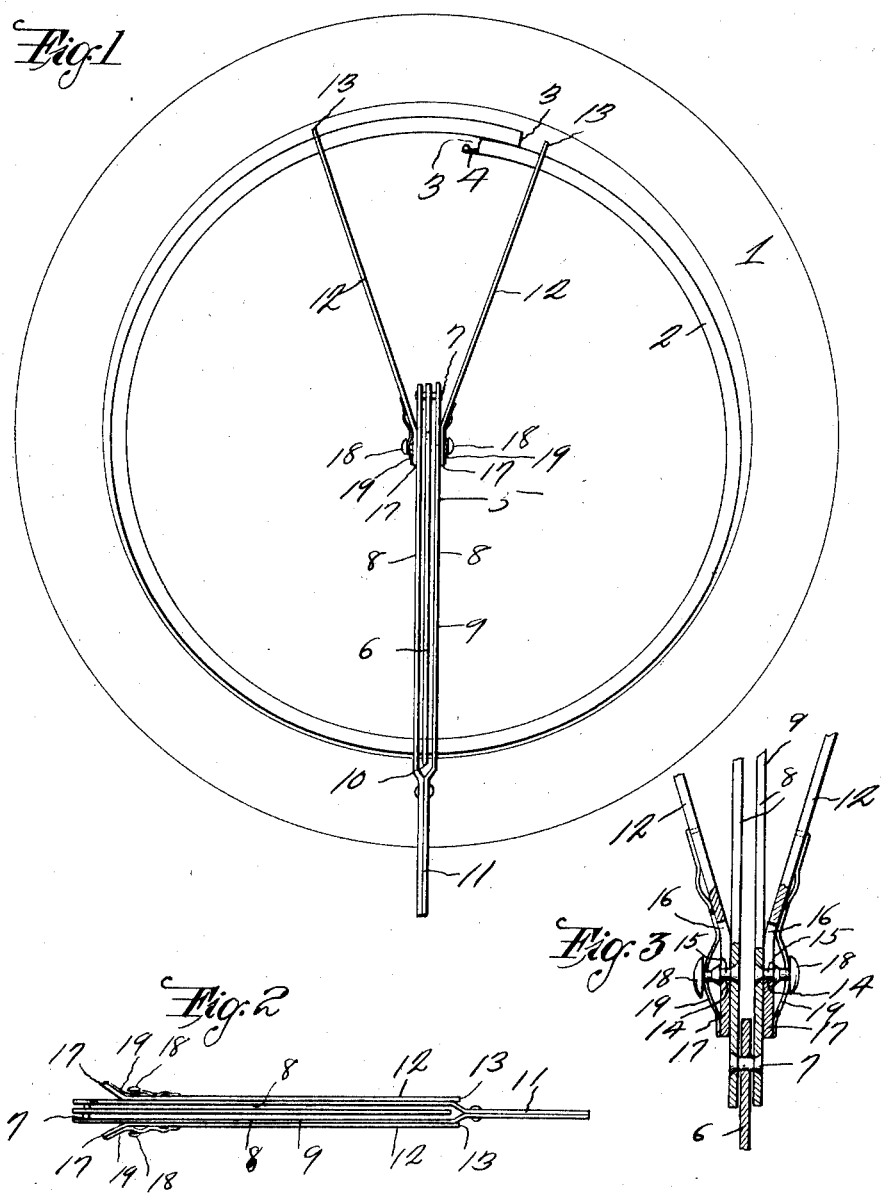

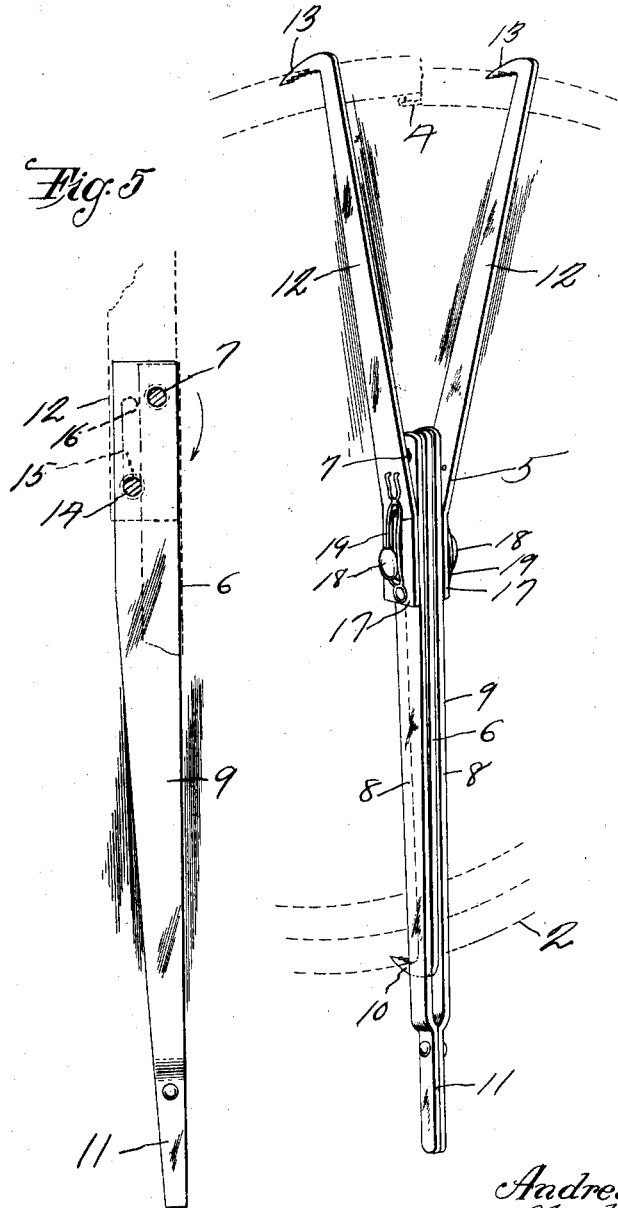
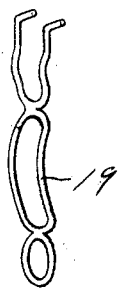

ANDREW ANDERSON AND CHARLES BROWN, OF ROCK SPRINGS, WYOMING.

DEMOUNTABLE-RIM CONTRACTOR.

1,385,353.  Specification of Letters Patent.  Patented July 26, 1921.

Application filed April 29, 1920. Serial No. 377,591.

*To all whom it may concern:*

Be it known that we, ANDREW ANDERSON and CHARLES BROWN, citizens of the United States, residing at Rock Springs, in the county of Sweetwater, State of Wyoming, have invented a new and useful Demountable-Rim Contractor; and we do hereby declare the following to be a full, clear, and exact description of the invention, such as will enable others skilled in the art to which it appertains to make and use the same.

The invention relates to demountable rim contractors and has for its object to provide a device of this character which may be easily and quickly applied to the adjacent abutting ends of the rim and to the rim at a substantially diametrically disposed point and provided with a lever, which lever when forced downwardly will contract the rim and assume a position past a vertical center where it will be held against upward movement.

A further object is to provide a rim contractor which may be so folded as to occupy an extremely small space. A further object is to provide a rim contractor comprising a lever having spaced arms, said lever having pivotally connected to one of its ends a rim engaging arm and also pivoted to its sides at a point spaced from its pivotal end upwardly and outwardly extending hooks adapted to engage the demountable rim adjacent the split therein. Also to provide elongated slots in which the pivotal pins of the upwardly and outwardly extending hooks are disposed so that the hooks may be disposed in such a way that they will engage the sides of the operating lever when it is desired to fold the tool into a compact form.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of demountable rim and tire showing the contractor applied thereto.

Fig. 2 is a plan view of the contractor showing the same in folded condition.

Fig. 3 is a detail sectional view through the contractor showing the pivotal points between the parts.

Fig. 4 is a perspective view of the contractor.

Fig. 5 is a side elevation of the operating lever showing the positions assumed by the parts adjacent the pivotal points.

Fig. 6 is a perspective view of one of the spring members for frictionally holding the diverging rim engaging arms.

Referring to the drawings, the numeral 1 designates a conventional form of automobile tire and 2 a demountable rim disposed therein. The demountable rim is of what is known as the split rim type, in which type it is necessary to force out of engagement the abutting ends 3 and also the interlocking member 4. To accomplish the above result the rim contractor 5 is provided, which rim contractor comprises a member 6, the upper end of which is hingedly connected as at 7 to the ends of and between arms 8 of an operating lever 9. The lower end of the member 6 is provided with a hook 10 adapted to engage the flange of the demountable rim 2. The lower end of the operating lever 9 is provided with a handle member 11 adapted to be grasped by the hand of an operator during a rim contracting operation. Pivoted to the spaced arms 8 of the operating lever 9 at a point spaced from the pivotal point 7 are upwardly and outwardly extending members 12, the upper ends of which are provided with hooks 13 adapted to engage the flange of the demountable rim 2, in such a manner that one hook will be disposed on each side of the split of the rim. The pivotal points 14 are formed by pins 15 which are carried by the arms 8 and which pins extend outwardly therefrom through elongated slots 16 in the portions 17 of the arms 12. It will be seen that during a rim contracting operation, that as the operating lever 9 is moved downwardly that the diverging arms 12 will be moved outwardly and downwardly on the pivotal points 14. By providing a space between the arms 8, it will be seen that when the operating lever 9 is in its extreme down position that the member 6 will be received in the space between the spaced arms 8 thereby allowing the pivotal points 14 to pass beyond a vertical center line drawn through the pivotal point 7. The lower end of the lever 9 being in engagement with the side of the rim, it will be seen that the inward movement of the operating lever 9 is limited and that the rim will be held in contracted position, thereby allowing it to be easily removed from the tire.

The pins 15 extend outwardly and are provided with heads 18, between which heads and the outer faces of the lower ends of the upwardly and outwardly extending arms 12, springs 19 are interposed. Springs 19 normally hold while the contractor is in use the parts in the position shown in Fig. 4. However, when the contractor is in collapsed or folded position as shown in Fig. 2 the arms 12 are forced downwardly until the pins 15 are disposed in the upper ends of slots 16. By so positioning the pins 15, it will be seen that the arms 12 may be disposed in engagement with the outer sides of the spaced arms 8, thereby allowing the contractor to be folded into a compact space. It will also be seen that the springs 19 will hold said arms 12 in said position.

From the above it will be seen that a rim contractor is provided which is extremely simple in construction, positive in its operation, and one wherein the pivotal points are so positioned that when the rim is in contracted position the operating lever will be prevented from being forced upwardly by the spring action of the rim and consequent expansion of the split rim.

The invention having been set forth what is claimed as new and useful is:—

A rim contractor comprising an operating lever having spaced arms, a rim engaging arm having one of its ends pivoted to the end of the operating lever and disposed between the arms thereof, arms pivoted on pins extending outwardly from the sides of the arms of the operating lever, said pivoted arms being bent at their pivoted ends and having elongate slots in the bends thereof for the reception of the outwardly extending pins, said pins being provided with heads spaced from the pivoted arms, springs interposed between the heads of the pins and the outer faces of the pivoted arms, said slots and springs being so placed and related that the arms will be held spread when the pins are at the inner ends of the slots and allowed to rest against the handle when the pins are at the outer ends of the slots.

In testimony whereof we have signed our names to this specification in the presence of two subscribing witnesses.

ANDREW ANDERSON.
CHARLES BROWN.

Witnesses:
 ROBT. D. MURPHY,
 A. L. McCURTAIN.